(12) United States Patent
Fera

(10) Patent No.: US 6,263,265 B1
(45) Date of Patent: Jul. 17, 2001

(54) WEB INFORMATION VAULT

(75) Inventor: Gregory J. Fera, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/410,553

(22) Filed: Oct. 1, 1999

(51) Int. Cl.$^7$ .............................. G06F 17/00; G06F 7/00
(52) U.S. Cl. ............................ 701/19; 701/24; 701/25; 701/28; 701/29; 701/33; 701/208; 701/211; 340/990; 246/122 R
(58) Field of Search ................................. 701/19, 24, 25, 701/28, 29, 30, 33, 35, 36, 200, 205, 207, 208, 211, 212, 214; 340/988, 990, 991, 992–995; 246/122 R

(56) References Cited

U.S. PATENT DOCUMENTS

| | | |
|---|---|---|
| 4,258,421 | 3/1981 | Juhasz et al. . |
| 4,270,174 | 5/1981 | Karlin et al. . |
| 4,463,418 | 7/1984 | O'Quin, II et al. . |
| 4,517,468 | 5/1985 | Kemper et al. . |
| 4,695,946 | 9/1987 | Andreasen et al. . |
| 4,823,914 | 4/1989 | McKinney et al. . |
| 4,970,725 | 11/1990 | McEnroe et al. . |
| 4,977,390 | 12/1990 | Saylor et al. . |
| 5,113,489 | 5/1992 | Cihiwsky et al. . |
| 5,123,017 | 6/1992 | Simpkins et al. . |
| 5,274,572 | 12/1993 | O'Neill et al. . |
| 5,282,127 | 1/1994 | Mii . |
| 5,321,837 | 6/1994 | Daniel et al. . |
| 5,329,465 | 7/1994 | Arcella et al. . |
| 5,400,018 | 3/1995 | Scholl et al. . |
| 5,406,502 | 4/1995 | Haramaty et al. . |
| 5,442,553 | 8/1995 | Parrillo . |
| 5,445,347 | 8/1995 | Ng . |
| 5,508,941 | 4/1996 | Leplingard et al. . |
| 5,528,499 | 6/1996 | Hagenbuch . |
| 5,528,516 | 6/1996 | Yemini et al. . |
| 5,594,663 | 1/1997 | Messaros et al. . |
| 5,631,832 | 5/1997 | Hagenbuch . |
| 5,633,628 | 5/1997 | Denny et al. . |
| 5,638,296 | 6/1997 | Johnson et al. . |
| 5,650,928 | 7/1997 | Hagenbuch . |
| 5,650,930 | 7/1997 | Hagenbuch . |
| 5,661,668 | 8/1997 | Yemini et al. . |
| 5,666,534 | 9/1997 | Gilbert et al. . |
| 5,678,002 | 10/1997 | Fawcett et al. . |
| 5,713,075 | 1/1998 | Threadgill et al. . |
| 5,740,046 | * 4/1998 | Elestedt .................................. 701/19 |
| 5,740,547 | * 4/1998 | Kull et al. ............................. 701/19 |
| 5,742,915 | 4/1998 | Stafford . |
| 5,806,011 | * 9/1998 | Azzaro et al. ......................... 701/19 |
| 5,809,161 | 9/1998 | Auty et al. . |
| 5,819,273 | 10/1998 | Vora et al. . |
| 5,842,125 | 11/1998 | Modzelesky et al. . |
| 5,845,272 | 12/1998 | Morjaria et al. . |
| 5,867,801 | * 2/1999 | Denny .................................... 701/19 |
| 5,884,073 | 3/1999 | Dent . |

(List continued on next page.)

OTHER PUBLICATIONS

Data–Tronic Gas Turbine Information And Control System; General Electric Gas Turbine Reference Library; 8 pgs. no date.

Primary Examiner—William A. Cuchlinski, Jr.
Assistant Examiner—Gertrude Arthur
(74) Attorney, Agent, or Firm—Carl A. Rowold; David G. Maire; Holland & Knight LLP

(57) ABSTRACT

A method for managing a fleet of mobile assets utilizing the Internet to display information regarding the location and performance parameters of the mobile assets. A user has access to multimedia information regarding the design parameters operating statistics, inspection reports, and maintenance recommendations regarding each of the mobile assets. A service provider may be linked via the Internet to a centralized data center for the analysis of data and updating of the Internet web pages.

19 Claims, 2 Drawing Sheets

U.S. PATENT DOCUMENTS

| | | |
|---|---|---|
| 5,884,202 | 3/1999 | Arjomand . |
| 5,905,433 | 5/1999 | Wortham . |
| 5,922,040 | 7/1999 | Prabhakaran . |
| 5,926,745 | 7/1999 | Threadgill et al. . |
| 5,931,878 | 8/1999 | Chapin et al. . |
| 5,949,345 | 9/1999 | Beckert et al. . |
| 5,950,147 | 9/1999 | Sarangapani et al. . |
| 5,988,645 | 11/1999 | Downing . |
| 6,028,537 | 2/2000 | Suman et al. . |
| 6,058,307 | 5/2000 | Garner . |
| 6,094,609 | 7/2000 | Arjomand . |
| 6,104,988 | 8/2000 | Klarer . |
| 6,112,085 | 8/2000 | Garner et al. . |
| 6,161,071 | 12/2000 | Shuman et al. . |
| 6,169,943 | 1/2001 | Simon et al. . |

\* cited by examiner

WEB INFORMATION VAULT

BACKGROUND OF THE INVENTION

The present invention relates generally to the field of managing a fleet of remote assets, and more particularly, to managing a fleet of locomotives by providing information to a user via an Internet web page.

The management of a large fleet of mobile assets, such as a fleet of trucks or railway locomotives, is a challenging logistics effort. There is continuing pressure for the owners of such assets to improve the efficiency of operations of the assets to remain competitive in the market place. For example, railroads must manage their fleets of locomotives to maximize the on-train time and to minimize the occurrence of unexpected failures in order to remain competitive with alternative modes of transportation. The assignee of the present invention is a supplier of locomotive engines and has developed numerous design features and services to maximize the efficiency of operation of its locomotive. The assignee of the present invention has also undertaken to provide integrated maintenance services to the owners of locomotives. Such services include the operation of a repair and maintenance service center and the supply of necessary parts and labor. The coordination of the servicing of a large fleet of locomotives and the communication with the various parties involved in such efforts is a monumental task.

BRIEF SUMMARY OF THE INVENTION

Thus, there is a particular need for an effective and efficient method for managing a large fleet of mobile assets. Such a method is disclosed herein comprising the steps of: providing a database; monitoring a plurality of operating parameters for each of a plurality of mobile assets; transferring data regarding operating parameters for each asset to the database; and providing information derived from the database to a user via an Internet web page. The method may further include the steps of: monitoring the operating parameters to identify an anomaly in the operating parameters of a first of the assets; developing a maintenance recommendation for the first of the assets in response to the anomaly; and posting the maintenance recommendation on an Internet web page. The use of an Internet web page provides the flexibility for efficiently presenting a large amount of data in a multi-media presentation including 2-way data exchange.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
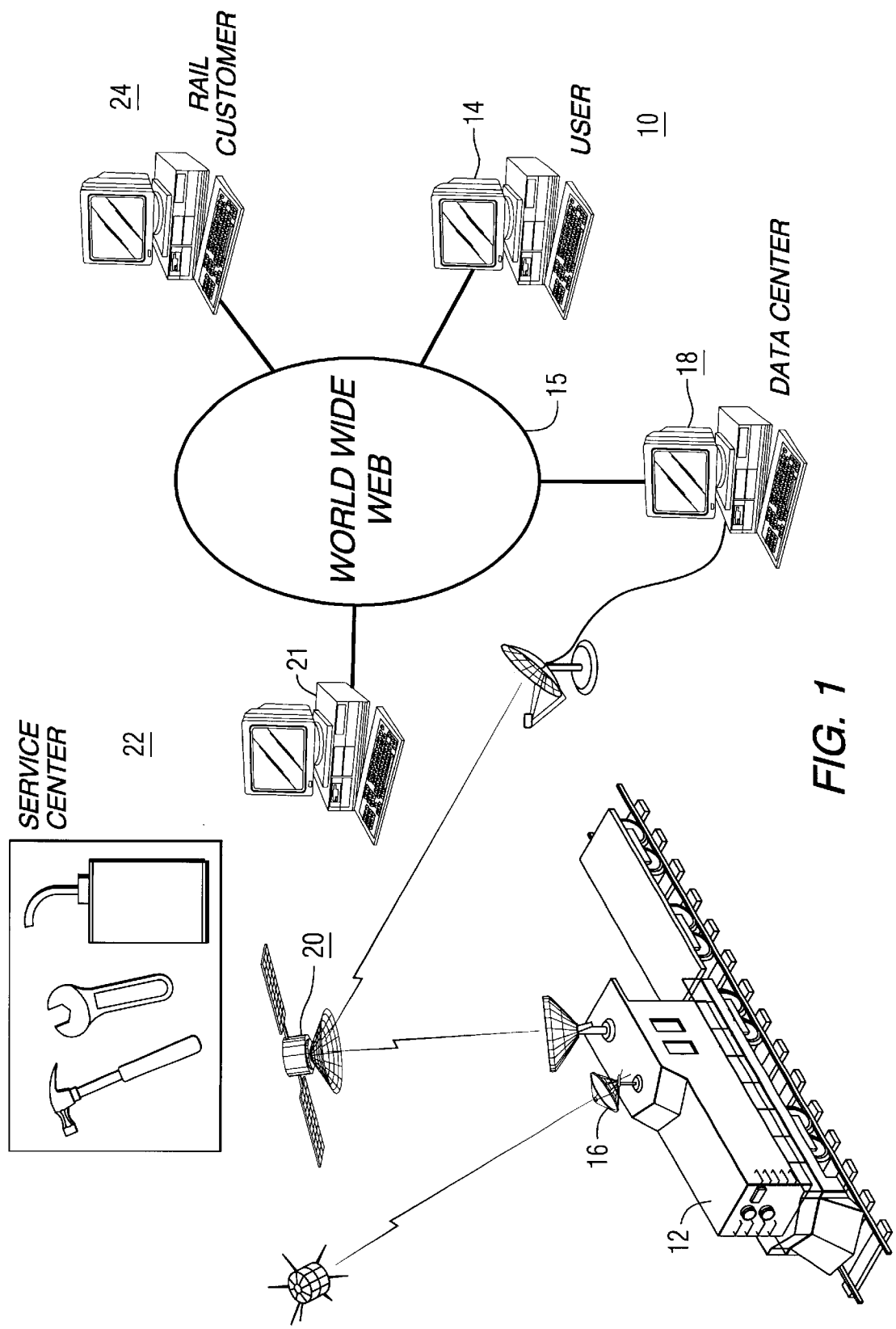
FIG. 1 is a schematic illustration of a communications network for managing a fleet of mobile assets.

The inventor has found that an important element in the effective management of a fleet of mobile assets is the ability to communicate information regarding the operability of each of the assets in a timely and effective manner. Accordingly, the inventor has envisioned the communication system 10 of FIG. 1 for a fleet of mobile assets such as a plurality of locomotives 12. The communication system 10 allows a user 14 to obtain detailed and timely information regarding the operating status of each of the mobile assets 12. In the embodiment of FIG. 1, the mobile assets 12 may be a fleet of locomotives owned and operated by a user 14 such as a transportation company. Locomotives 12, such as those provided by the assignee of the present invention, may be equipped with a plurality of sensors for monitoring a plurality of operating parameters representative of the condition of the locomotive 12 and of the efficiency of its operation. The locomotive 12 may also be equipped with a GPS receiver 16 or other satellite based or local instrument for determining the geographic location of the locomotive 12. Data regarding the location of the locomotive 12 and its operating parameters may be transferred to a data center 18, such as by a satellite system 20. The assignee of the present invention operates such a data center 18 at its Monitoring and Diagnostics Service Center (MDSC) in Erie, Pa. Affiliated with such a data center 18 may be one or more service centers 22 where the locomotives 12 are taken for repair and maintenance services.

As illustrated in FIG. 1, the data center 18 and service center 22 may both be linked to the Internet 15 by computer connections. The Internet and World Wide Web provide a means for communicating between the data center 18 and service center 22. Furthermore, these facilities may also be in communication with the transportation company user 14 via an Internet connection. Customers of the transportation company or other members of the public 24 may further be in communication with these facilities through Internet 15 links. Because the Internet 15 provides a means for communicating data and information in a multi-media format, it is a useful vehicle for displaying and communicating the large amount of data that may be associated with the operation of a fleet of mobile assets 12.

Figure 2:
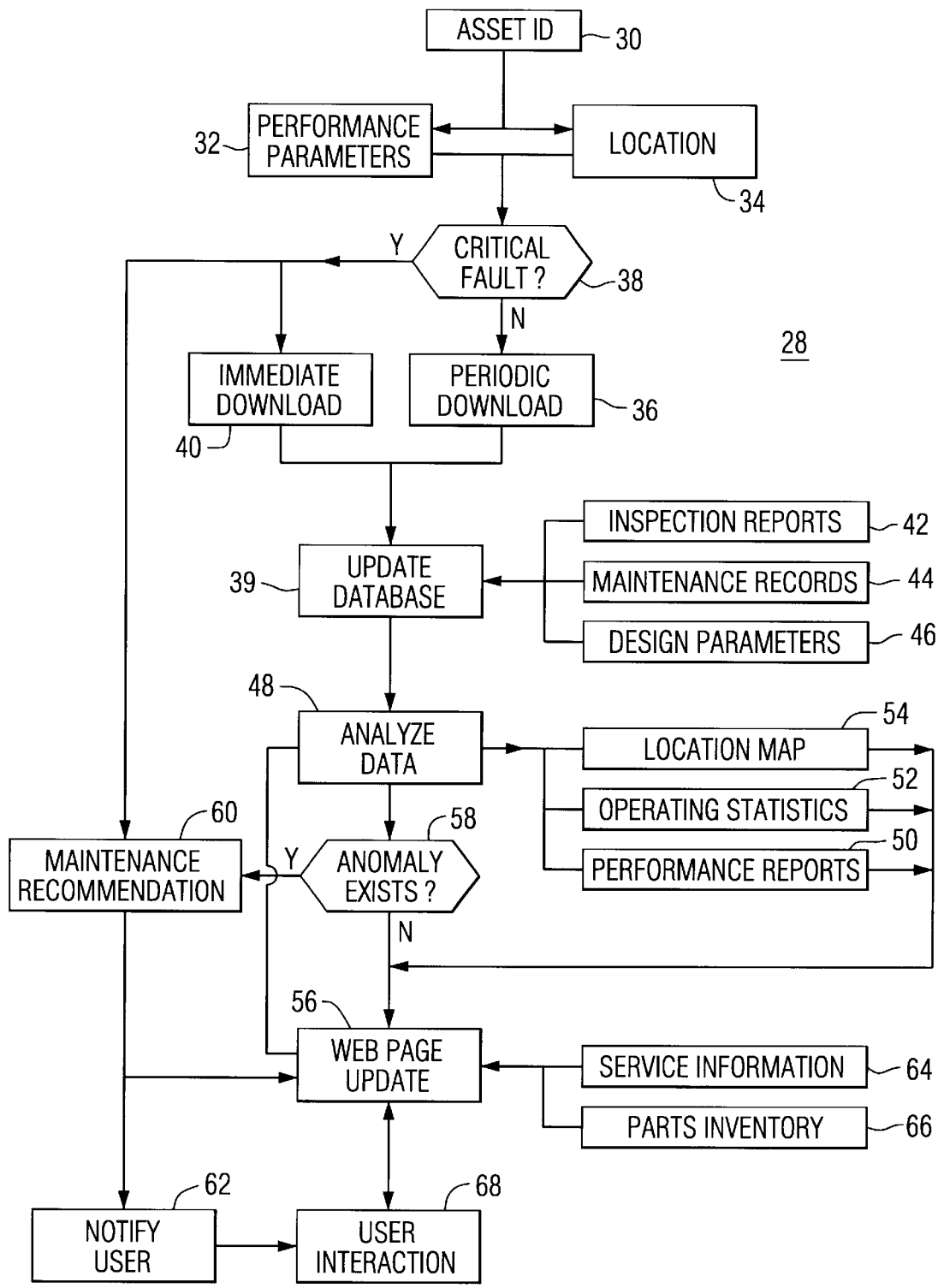
FIG. 2 illustrates the steps of a method for managing a fleet of mobile assets.

FIG. 2 illustrates a method 28 for managing a fleet of mobile assets that may be implemented by using a communications system 10 having a link to the Internet 15 such as is illustrated in FIG. 1. Each mobile asset may be uniquely identified, such as by an identification number, as in step number 30 of FIG. 2. For the embodiment of a fleet of locomotives 12, the operating parameters of each of the locomotives 12 is monitored 32 by the on-board sensors. Preferably, such operating parameters are monitored in real time, and data related to these operating parameters is available for communication to a data center 18 wherever appropriate. The location of each asset is also determined 34, such as by using a GPS system or by otherwise identifying the locomotive to a particular location on the rail line. Data regarding both the location and the operating parameters for each locomotive 12 may be periodically downloaded 36 from an on-board data file to a centralized data base 18. In the event of a critical fault 38 in one of the systems of a locomotive, it may be preferred to download data from the locomotive 12 immediately upon recognition of the fault 40. By critical fault it is meant any failure or abnormal operating condition that may have a significant effect on the ability of the locomotive to perform its intended function, such as for example, the loss of adequate lube oil pressure.

The data base located at the data center 18 may also include data representing inspection reports 42, maintenance records 44, and design parameters 46 related to the fleet of vehicles. For example, if a locomotive engine 12 is returned to a service center 22 for a periodic inspection and maintenance visit, information regarding the results of the inspection and maintenance activities may be used to update the data base 38 for that particular locomotive 12. The data base may also be updated 38 if the designer of the locomotive 12 provides any revised design parameters 46, such as a new part number for an upgraded component. The quantity of data in such a data base may be immense when considering the number of mobile assets in some fleets, and when considering the amount of data that may be collected on a periodic basis regarding the performance of each of the mobile assets. However, the computing power of modern data processing equipment makes it easy to analyze 48 such a data base. Various data processing routines may be utilized to generate performance reports 50 regarding each of the individual assets or the fleet as an entirety. Statistical data 52 may be calculated to aid in the analysis of the operating parameters of the fleet. One specific output from such an analysis 48 of the data may be a location map 54 that would plot the location of each of the individual assets on a geographic representation of the service area of those assets. For example, for a fleet of locomotives 12, a map may be generated illustrating the network of rail lines of the transportation company, with an indicator in the appropriate locations on the map to illustrate the current location of each of the locomotives.

In order to effectively utilize the vast amount of data that may be available regarding a fleet of mobile assets, the output of the analysis 48 of such data must be effectively displayed and conveyed to an interested user 14. There may be more than one user 14,24 interested in the data, and the level of detail of interest may vary from time to time. The inventor has found that an Internet web page is an effective means for communicating such data and information. As illustrated in FIG. 2, an Internet web page may be updated 56 to reflect the performance reports 50, operating statistics 52, and/or current location map 54 for the fleet of mobile assets. One or more such web pages may be utilized with appropriate hyperlinks to additional web pages. By nesting related web pages, the level of detail presented to the user 14 may be controlled by that user. For example, a location map 54 illustrating the current geographic location of each of the locomotives 12 owned by a transportation company may include a hyperlink at the indication of the location of each of the locomotives 12. The hyperlink could provide a link to an additional web page displaying specific information related to the operating parameters of that particular locomotive 12. One user such as a customer 24 of the transportation company may only be interested in the location of the train. Another user 14 such as a service engineer employed by the railroad may be interested not only in the location of the locomotive, but also the amount of fuel on-board or other operating parameter. Both such users 14,24 can quickly obtain the information they need by a simple point and click operation using an Internet browser.

An Internet web page display used with the present invention may incorporate the full power of the multi-media capabilities of the Internet 15. For example, the location map 54 may include the use of color to indicate a readiness status for each locomotive, for example, green for a properly functioning locomotive, yellow for a locomotive exhibiting an anomaly in one of its operating parameters, and red for a locomotive having a critical fault. The user 14 of such information would be able to quickly assimilate a large volume of data and to have his/her attention directed to important portions of the data. Such an Internet web page may also include links to additional pages containing drawings of component parts, specifications, or operating and repair manuals or other design parameters 46. In some instances, it may be advantageous to include video information on such an Internet web page, such as still or motion pictures transmitted from the mobile asset to show the condition of a component. Such video information may be accompanied by live audio information, thereby allowing the user 14, the operator located on the locomotive 12, and personnel at a service center 22 to conference regarding a developing anomaly.

When a critical fault is identified 38, or an anomaly is found to exist 58 in one or more of the operating parameters, a maintenance recommendation may be developed 60. Information regarding the anomaly 58, critical fault 38, and/or maintenance recommendation 60 may also be uploaded 56 to an Internet web page. When appropriate, a user may be notified 62 that new or urgent information has been displayed on the Internet web page. The user may be notified 62 by an electronic mail message, telephone call, fax or other simple form of communication. The user may then actively interact 68 with the web pages that present data regarding the mobile asset of interest.

The information available to the user on the Internet web page may also include information regarding services that are available 64 and/or a parts inventory 66 that may be important to any decision regarding a maintenance recommendation 60. Personnel located at a service center 22 may not only provide data for the user 14, but may also receive a communication from the user 14 regarding a planned maintenance activity, thereby facilitating the scheduling of maintenance activities at the service center 22.

The advantage of the communication system 10 of FIG. 1 and method 28 of FIG. 2 may be appreciated by considering a three locomotive train 12 operating in a relatively flat terrain on its way to a mountainous section of a rail line. Because the three locomotives are operating at reduced capacity along the flat terrain, the operator of the locomotives, who may be physically sitting in the front locomotive, may not be aware that a degraded condition has developed in the third locomotive. For example, a degraded cooling system may cause the third locomotive to throttle back to a reduced power output. Because the first and second locomotives are able to provide the necessary power, the progress of the train is unimpeded. Should this degraded condition continue to go unnoticed, the train would be unable to negotiate the mountainous terrain that it is approaching later in the journey. However, on-board sensors on the third locomotive identify the degraded cooling condition and data related to the degraded condition is immediately downloaded 40 to the data center 18 to update the data center database 38. Computers and/or personnel located at the data center 18 may analyze the data 48 and identify that the anomaly exists 58 and determine that a maintenance action 60 is recommended. For example, if a fan motor controller has developed a malfunction, a maintenance recommendation 60 to replace the control panel may be generated. A web page display showing the location of the locomotive would then be promptly updated 56 to show the degraded condition, and the railroad maintenance personnel are notified 62 by an electronic mail message that is automatically generated at the data center 18. The e-mail will include a Universal Resource Locator (URL) directing the maintenance personnel to an Internet web page containing information regarding the degraded condition and the recommended maintenance activity. The maintenance personnel then view the available parts inventory 66 illustrated on another web page to verify the availability of the required control panel in a service center 22 located along the route of the locomotive 12. In this example, a user 14 is able to utilize the power of an Internet web page presentation to quickly assess the importance of anomaly affecting one of a fleet of mobile assets and to assess various options for addressing such anomaly. For this example, the degraded locomotive may be repaired prior to the train becoming stalled on a mountainous section of the track, thereby avoiding a large out-of-pocket expense and a costly schedule delay for the transportation company. The speed of communication via the Internet and the breath of information that may be effectively communicated via an Internet web page makes the communication system 10 of FIG. 1 and the method of managing assets 28 of FIG. 2 operable for a large fleet of mobile assets distributed over a large geographic area.

Access to an Internet web page containing important information regarding a fleet of mobile assets may be restricted to only those users having appropriate authorization to access such data. For example, information derived from the analysis 48 of the data base may be displayed on a password protected Internet web page. Only authorized users 14,24 would then be provided with the password necessary to gain access to the web page. Similarly, information received from a user and used to update the web page 56 may only be accepted as authentic if the user enters an appropriate password to confirm his/her identity. Other protection measures such as encrypting data may also be used. In some cases it may be desired to have at least a portion of the information displayed on an Internet web page be made publicly available. For example, it may be desirable to make the location map 54 for at least a portion of the mobile assets available for public viewing. In the case of a railroad transportation company, the location of passenger trains may be information that can be made available on a public Internet web page, whereas the location of freight trains may be limited to only specific industrial customers of the railroad company.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method for managing a fleet of locomotives, the method comprising:

providing a data base containing data regarding locomotives;

monitoring a plurality of operating parameters for each of a plurality of locomotives;

determining the location of each locomotive:

transferring data regarding location and operating parameters for each locomotive to the data base;

providing information derived from the data base to a user via an Internet web page, wherein the step of providing information comprises displaying a map of a railroad on an Internet web page and indicating the location of each of the plurality of locomotives on the map.

2. The method of claim 1, further comprising the step of providing a hyperlink at the indication of the location of each of the plurality of locomotives, wherein each hyperlink provides a link to an Internet web page displaying information related to the operating parameters of the respective locomotive.

3. A method for managing a fleet of locomotives, the method comprising:

providing a data base containing data regarding locomotives;

monitoring a plurality of operating parameters for each of a plurality of locomotives;

determining the location of each locomotive;

transferring data regarding location and operating parameters for each locomotive to the data base;

providing information derived from the data base to a user via an Internet web page, using the data regarding operating parameters to prepare operating statistics; and providing the operating statistics to the user via an Internet web page.

4. A method for managing a fleet of locomotives, the method comprising:

providing a data base containing data regarding locomotives;

monitoring a plurality of operating parameters for each of a plurality of locomotives;

determining the location of each locomotive;

transferring data regarding location and operating parameters for each locomotive to the data base;

providing information derived from the data base to a user via an Internet web page, monitoring the operating parameters to identify an anomaly in a first of the locomotives; and displaying information related to the anomaly on an Internet web page.

5. The method of claim 4, further comprising the step of directing the user to the Internet web page containing information related to the anomaly.

6. The method of claim 5, wherein the step of directing comprises sending an electronic mail message to the user.

7. A method for managing a fleet of locomotives, the method comprising:

providing a data base containing data regarding locomotives;

monitoring a plurality of operating parameters for each of a plurality of locomotives;

determining the location of each locomotive;

transferring data regarding location and operating parameters for each locomotive to the data base;

providing information derived from the data base to a user via an Internet web page, monitoring the operating parameters to identify an anomaly in a first of the locomotives;

developing a maintenance recommendation in response to the anomaly; and displaying information related to the anomaly and maintenance recommendation on at least one Internet web page.

8. The method of claim 7, further comprising the step of directing the user to the at least one Internet web page containing information related to the anomaly and maintenance recommendation.

9. The method of claim 8, wherein the step of directing comprises sending an electronic mail message to the user.

10. The method of claim 8, further comprising the steps of:

displaying information related to a maintenance service on an Internet web page;

providing a link from the at least one Internet web page displaying information related to the anomaly and maintenance recommendation to the Internet web page displaying information related to the maintenance service.

11. A method for managing a fleet of land-based vehicles, the method comprising:

provide a data base;

monitoring a plurality of operating parameters for each of a plurality of land-based vehicles;

transferring data regarding operating parameters for each land-based vehicle to the data base;

providing information derived from the data base to a user via an Internet web page;

storing maintenance records for each land-based vehicle in the data base;

analyzing the maintenance records and the operating parameters to develop a maintenance recommendation for each land-based vehicle; and displaying data related to the maintenance recommendations on an Internet web page.

12. The method of claim 11, further comprising the steps of:

storing data related to a parts inventory in the database;

analyzing the data related to the maintenance recommendations and the parts inventory to generate a parts order list;

displaying data related to the parts order list on an Internet web page.

13. A method for managing a fleet of land-based vehicles, the method comprising:

providing a data base;

monitoring a plurality of operating parameters for each of a plurality of land-based vehicles;

transferring data regarding operating parameters for each land-based vehicle to the data base;

providing information derived from the data base to a user via an Internet web pages;

monitoring the operating parameters to identify an anomaly in the operating parameters of a first of the land-based vehicles;

developing a maintenance recommendation for the first of the land-based vehicles in response to the anomaly; and posting the maintenance recommendation on an Internet web page.

14. The method of claim 13, further comprising the step of directing the user to the Internet web page containing the maintenance recommendation.

15. A method for managing a fleet of land-based vehicles, the method comprising:

providing a data base;

monitoring a plurality of operating parameters for each of a plurality of land-based vehicles;

transferring data regarding operating parameters for each land-based vehicle to the data base;

providing information derived from the data base to a user via an Internet web page; and providing a graphical display of the locations of the land-based vehicles to the user on an Internet web page.

16. A method for managing a fleet of land-based vehicles, the method comprising:

providing a data base;

monitoring a plurality of operating parameters for each of a plurality of land-based vehicles;

transferring data regarding operating parameters for each land-based vehicle to the data base;

providing information derived from the data base to a user via an Internet web page;

monitoring the operating parameters in real time to identify a critical fault in a first of the land-based vehicles;

transferring data related to the critical fault from the first of the land-based vehicles to the data base; and displaying information related to the critical fault on an Internet web page.

17. The method of claim 16, further comprising the step of directing the user to the Internet web page containing information related to the critical fault.

18. The method of claim 16, further comprising the step of directing a service provider to the Internet web page containing information related to the critical fault.

19. A method for managing a fleet of land-based vehicles, the method comprising:

providing a data base;

monitoring a plurality of operating parameters for each of a plurality of land-based vehicles;

transferring data regarding operating parameters for each land-based vehicle to the data base;

providing information derived from the data base to a user via an Internet web page, wherein the step of providing information derived from the data base to a user via an Internet web page further comprises:

displaying information derived from the database on a password protected Internet web pages; and providing the user with the password for the password protected Internet web page.

* * * * *